(Model.)
M. T. NESBITT.
GREEN CORN CUTTER.
No. 247,511. Patented Sept. 27, 1881.
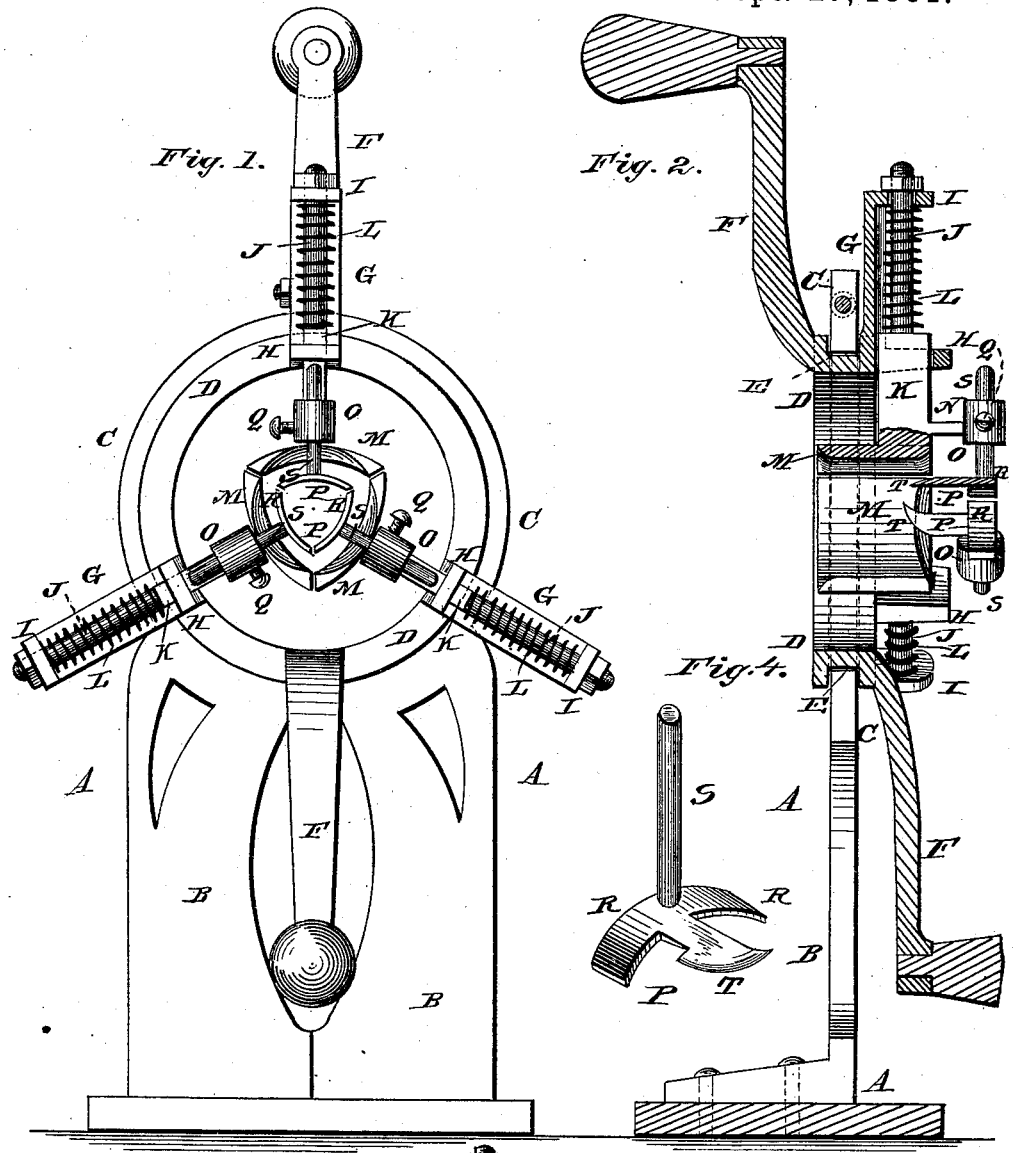
WITNESSES
Fred. G. Dieterich
P. C. Dieterich
INVENTOR
M. T. Nesbitt
by C. A. Snow and Co.
Attorneys
N. PETERS. Photo-Lithographer, Washington, D. C.

United States Patent Office.

MOSES T. NESBITT, OF COLORA, MARYLAND.

GREEN-CORN CUTTER.

SPECIFICATION forming part of Letters Patent No. 247,511, dated September 27, 1881.

Application filed July 23, 1881. (Model.)

*To all whom it may concern:*

Be it known that I, MOSES T. NESBITT, of Colora, in the county of Cecil and State of Maryland, have invented certain new and useful Improvements in Machines for Cutting Corn from the Cob; and I do hereby declare that the following is a full, clear, and exact description of the invention, which will enable others skilled in the art to which it appertains to make and use the same, reference being had to the accompanying drawings, which form a part of this specification.

Figure 1 is a front view of my improved machine for cutting green corn. Fig. 2 is a vertical sectional view of the same. Fig. 3 is a detail view of one of the guards, stems, and cutters; and Fig. 4 is a view of one of the cutters detached.

Corresponding parts in the several figures are denoted by like letters of reference.

This invention relates to machines for removing or cutting green corn from the cob for canning, drying, or other purposes; and it consists in certain improvements in the construction of the same, which will be hereinafter fully described, and particularly pointed out in the claims.

In the drawings hereto annexed, A represents the frame of the machine, which consists of suitable standards or uprights, B B, constructed and connected so as to form a circular bearing, C, for a ring, D, which is provided with an annular groove, E, by which it is fitted to revolve in the said bearing C, the motive power being supplied by one or more crank-arms, F, or in any other suitable manner. The ring D is provided with several radial arms, G, usually and preferably three in number, and all provided with forward-projecting brackets H I, forming bearings for the stems J of the guards. The lower or inner ends of the said stems have square shoulders K, between which and the upper or outer brackets, H, springs L are interposed, to force the stems and the guards and cutters carried thereby toward the center of the revolving ring D.

The guards, which are denoted by the letter M, consist of segmental plates cast or otherwise secured upon the inner ends of the stems, as shown, and provided with forwardly-projecting brackets N, having bearings O, in which the cutters P are held securely by means of set-screws Q. The said cutters consist of narrow segmental plates R, having shanks S to fit in the bearings O, and provided with inwardly-projecting curved knives T, by means of which the corn is removed from the cob and caused to drop down into some suitable receptacle.

The operation of my invention is simple and will be readily understood. The ears are fed, by hand or by any suitable mechanism, between the guards, which, being mounted upon radially-moving stems, will adapt themselves to ears of different sizes. The ear of corn, being held stationary while the cutters revolve, is stripped to the cob rapidly, easily, and effectually.

It will be observed that while the cutters move radially with the guards they may be separately and independently adjusted.

Having thus described my invention, I claim and desire to secure by Letters Patent of the United States—

1. In a green-corn cutter, the herein-described grooved revolving ring, having radially-movable guards forced inward or toward the center by suitably-arranged springs, and said guards carrying the cutters, as herein described, for the purpose set forth.

2. In a machine for cutting green corn, the combination of the revolving ring D, having bracketed arms G, the stems J, sliding radially in bearings in the said brackets, and having guard-plates M and shoulders K, and the springs L, all arranged and operating as herein described, for the purpose set forth.

3. The combination, with the herein-described radially-movable guard-plates, of the adjustable cutters P, having shanks S, curved plates R, and knives T, as and for the purpose set forth.

In testimony that I claim the foregoing as my own I have hereto affixed my signature in presence of two witnesses.

MOSES T. NESBITT.

Witnesses:
E. F. SCOTT,
LEWIS H. KIRK.